United States Patent [19]
de Gaston

[11] Patent Number: 5,127,896
[45] Date of Patent: Jul. 7, 1992

[54] ANTHROPOMORPHIC TANK SUIT

[75] Inventor: Alexis N. de Gaston, Los Angeles, Calif.

[73] Assignee: McDonnell Douglas Corporation, Long Beach, Calif.

[21] Appl. No.: 402,359

[22] Filed: Sep. 5, 1989

[51] Int. Cl.⁵ .............................................. B64D 10/00
[52] U.S. Cl. .................. 600/20; 128/202.11; 2/2.1 A
[58] Field of Search .......... 600/19, 20; 2/2.1 A, 2/23, 233, DIG. 3; 128/202.11, 204.26, 204.29

[56] References Cited

U.S. PATENT DOCUMENTS

| | | | |
|---|---|---|---|
| 2,228,115 | 1/1941 | Holste | 2/2.1 A |
| 2,948,292 | 8/1960 | Fitt | 128/204.26 |
| 3,528,414 | 9/1970 | Schueller | 2/2.1 A |
| 3,699,589 | 10/1972 | Durney | 2/2.1 A |
| 3,705,426 | 12/1972 | Marcum, Jr. et al. | 2/2.1 A |
| 3,751,727 | 8/1973 | Shepard et al. | 600/20 |
| 3,752,175 | 8/1973 | Hamilton et al. | 128/204.29 |
| 4,172,455 | 10/1979 | Beaussant | 128/201.23 |
| 4,227,444 | 10/1980 | Lincicome | 128/204.29 |
| 4,548,730 | 10/1985 | Koslow | 252/186.38 |
| 4,561,123 | 12/1985 | Hull | 2/23 |
| 4,598,428 | 7/1986 | Vykukal | 285/168 |
| 4,676,236 | 6/1987 | Piorkowski et al. | 128/201.23 |
| 4,787,576 | 11/1988 | McGrady et al. | 244/122 R |
| 4,799,476 | 1/1989 | McGrady | 600/20 |
| 4,834,322 | 5/1989 | Wurst | 244/122 AG |
| 4,923,147 | 5/1990 | Adams et al. | 244/122 AG |
| 4,925,133 | 5/1990 | Wurst et al. | 244/118.5 |

FOREIGN PATENT DOCUMENTS 2499373  8/1982  France ............................ 2/DIG. 3

OTHER PUBLICATIONS

Merrifield, "USAF to Test Tactical Life Support System", *Aviation Week & Space Technology*, Oct. 20, 1976, p. 77.

Primary Examiner—Edgar S. Burr
Assistant Examiner—Stephen R. Funk
Attorney, Agent, or Firm—Donald E. Stout; Gregory A. Cone; John P. Scholl

[57] ABSTRACT

This invention is an integrated anthropomorphic g-suit, with a breathing regulator and means for protecting the user of the suit from hostile environments. The suit has a flexible, distensible, impermeable inner liner that conforms to a user's body, and a flexible, impermeable, nondistensible outer liner that fits over the inner liner, to trap a thin layer of fluid between the inner and outer liners. The suit acts as a tank of fluid, so that the suit exerts a hydrostatic pressure on the user's body, preventing blood from draining from the user's head, when the user is subjected to acceleration. The breathing regulator is responsive to the pressure of the fluid in the suit, such that the pressure of the breathing gases being supplied to the user is approximately the same as the fluid pressure in the thoracic region of the suit. The regulator can vary the pressure of the breathing gas, automatically as a function of ambient pressure. Chemical, radiation and biological protection is provided by the fluid, which circulates through a heat exchanger incorporated into the suit.

20 Claims, 8 Drawing Sheets

ANTHROPOMORPHIC TANK SUIT

FIELD OF INVENTION

This invention relates to the field of holistic personal protection systems, that is primarily designed to protect a user from the effects of acceleration, but can also protect the user from the effects of radiation, biological, and chemical contaminants, as well as providing thermal control, altitude protection and floatation capabilities.

BACKGROUND OF THE INVENTION

The effectiveness of fighter aircraft today is a function not only of the plane, but of the ability of the pilot to withstand the g-loads created by aircraft manuevering. When the pilot is subjected to high accelerations, his blood drains from his head and "pools" into his lower extremities, causing dizziness, unconsciousness and possible death. Recent attempts to provide anti-g protection are shown in Beaussant, U.S. Pat. No. 4,546,491; Beaussant et al., U.S. Pat. No. 4,230,097, Crosbie et al., U.S. Pat. No. 4,243,024; Crosbie et al., U.S. Pat. No. 4,534,338; Krough et al., U.S. Pat. No. 4,638,791; Van Patten, U.S. Pat. No. 4,736,731; *Aviation Week And Space Technology,* "USAF to Test Tactical Life Support System", Oct. 20, 1986, pg. 77, which use air inflated trousers and an elaborate system of valves and electronic valve inputs to pressurize the suit. McGrady et al., U.S. Pat. No. 4,787,576 shows a seat that is capable of reclining, positioning the pilot normal to the direction of acceleration, preventing the pooling of blood. The response time of these devices is inadequate in the initial stages of acceleration, since the pilot can lose consciousness during the period that his suit inflates or the seat reclines. Additionally, these suits are only effective up to 8 g's, wherein present aircraft are capable of sustaining 12 g's. A "g" as used herein, denotes a unit of acceleration equal to 32.2 feet per second per second, or 9.81 meters per second per second. Thus there is need for a simple, anti-g suit that instantaneously responds to aircraft rapid onset accelerations up to at least 12 g's.

As shown in Holste, U.S. Pat. No. Re 22,101; Beall, U.S. Pat. No. 2,335,474; Gray, U.S. Pat. No. 3,089,482; Kops et al., U.S. Pat. No. 3,124,123; Gongwer, U.S. Pat. No. 3,137,290; it has long been known that surrounding the body with a fluid will counteract the g-load effect. When subjected to acceleration, the fluid exerts a hydrostatic pressure on the user's body, squeezing the lower extremities and preventing the blood from "pooling". The fluid also squeezes the user's chest making it difficult to inhale. The increased fluid pressure on the chest, can be offset by providing the user with pressurized breathing gases which help counteract the fluid pressure on the chest wall. In most aircraft, pressurized gases are supplied to the user when the aircraft reaches a predetermined altitude. These systems are inadequate for g-protection because they are responsive to ambient pressure and not g-forces. If the user is at low altitude and is subjected to g-loads, no pressurized breathing is provided to overcome the increased hydrostatic fluid pressure. Providing a constant supply of pressurized gases is also inadequate. For example, if the gas pressure is set to overcome fluid pressure at 4 g's, it would provide too much pressure at 1 g, making it difficult for the user to exhale. Therefore, there is a need for a fluid filled g-suit having a regulator that supplies, and instantaneously changes the pressure of breathing gases supplied to the user, as a function of acceleration and ambient pressure.

Regulators as shown in Seireg et al., U.S. Pat. No. 4,289,126; Wetzel et al., U.S. Pat. No. 4,676,238; Christianson, U.S. Pat. No. Re 31,932, are used in underwater breathing apparatuses, and provide increased air pressure, as the diver descends and the water pressure increases. Heretofore, such regulators have not been integrated into a g-suit and have not been made responsive to acceleration.

A pilot is subjected to various hostile environments, such as temperature extremes, radiation bombardment, and biological and chemical contaminants. Protective body suits, incorporating heat exchangers are old in the art as shown in Parker et al., U.S. Pat. No. 3,744,053; Wiswell, U.S. Pat. No. 3,391,405; Curtis, U.S. Pat. No. 3,635,216; Chambers et al., U.S. Pat. No. 3,736,764, but there has yet to be a fluid filled g-suit, wherein the fluid provides radiation, chemical and or biological protection in addition to temperature control.

In summary there has never been a g-suit which can be an integrated self-sufficient unit, that allows a user to work in comfort, while subjected to acceleration, high altitudes, extreme temperatures, and hostile radiation, biological and chemical environments.

SUMMARY OF THE INVENTION

This invention is a fluid filled integrated anthropomorphic g-suit, with means for protecting the user of the suit from hostile environments. A regulator instantaneously responsive to g-loads is operatively connected to the fluid, such that the user is provided with a supply of pressurized breathing gases that will offset the increased hydrostatic pressure of the fluid on the user's chest, when the user is subjected to high g-loads.

The suit has a flexible, distensible, impermeable inner liner that conforms to the body of the user, and a flexible, impermeable, nondistensible outer liner that fits over the inner liner. The outer liner is spaced from the inner liner, such that there is one or more thin fluid filled compartments between the liners. Preferably, the suit covers the user's body from approximately the neck to the feet, whereby the suit acts like a tank of fluid, that exerts a hydrostatic pressure on the user of the suit. This fluid pressure counteracts the hydrostatic pressure of the user's blood when subjected to g-forces, which if not counteracted would expand the skin in the depended parts of the body, allowing the blood to drain from the head and "pool" into the swollen dependent body parts. A fluid reservoir can be attached to the suit to compensate for any changes in the volume of the fluid compartment.

If temperature control is desired, a heat exchanger can be incorporated into the suit which is capable of providing heat or refrigeration to the fluid, which circulates throughout the suit, cooling or heating the user. The fluid can be a radiation absorbing liquid such as barium iodide, with additives to protect the user from chemical and biological contaminants.

The suit is equipped with means for supplying pressurized breathing gases to the user. The gases pass through the regulator, which is attached to the suit in the area of the lungs. The regulator is primarily responsive to the pressure of the fluid in the suit, controlling the flow of the gases, such that the pressure of breathing gases being supplied to the user's lungs, is approximately the same as the fluid pressure in the thoracic region of the suit. This allows the user to breath easily without having to overcome the pressure of the fluid during high g's. The regulator is a simple, self-contained apparatus, with the capability of providing control means to allow the user to adjust the gas pressure to suit his individual breathing needs and comfort. The regulator also has means to vary the gas pressure as a function of ambient pressure, in the event the user becomes exposed to low ambient pressures.

The suit can be used in various applications from piloting aircraft, to cleaning up nuclear accidents or toxic waste sites. The suit is capable of being self-contained, so that the suit can be used without being constrained by various life support equipment.

Therefore it is an object of the present invention to provide a practical g-suit, which will allow a user to function while being subjected to accelerations greater than 1 g.

Another object is to have a g-suit that will provide a user, instantaneous protection from the effects of acceleration.

Another object is to provide pressurized breathing means, incorporating a regulator that instantaneously responds to high g forces and allows a user to breath comfortably.

Another object is to Provide pressurized breathing means, incorporating a regulator that instantaneously responds to high g forces and ambient pressure.

Another object is to provide a simple, self-contained, integrated system, that can simultaneously protect the user against high-g loads, thermal extremes, low ambient pressure, radiation, chemical and biological contaminants.

Another object is to provide thermal protection and floatation capability, in the event the user must bail-out into a cold body of water.

These and other objectives and advantages of the present invention will become apparent to those skilled in the art, after considering the following detailed description together with the accompanying drawings, wherein:

BRIEF DESCRIPTION OF THE DRAWINGS

FIG. 14a is a cross-sectional view of FIG. 14, taken at line 14a—14a;

FIG. 15a is a cross-sectional view of FIG. 15, taken at line 15a—15a;

FIG. 16a is a cross-sectional view of FIG. 16, taken at line 16a—16a;

FIG. 17a is a cross-sectional view of FIG. 17, taken at line 17a—17a;

DETAILED DESCRIPTION OF THE INVENTION

Figures 1, 2, 3, 4:
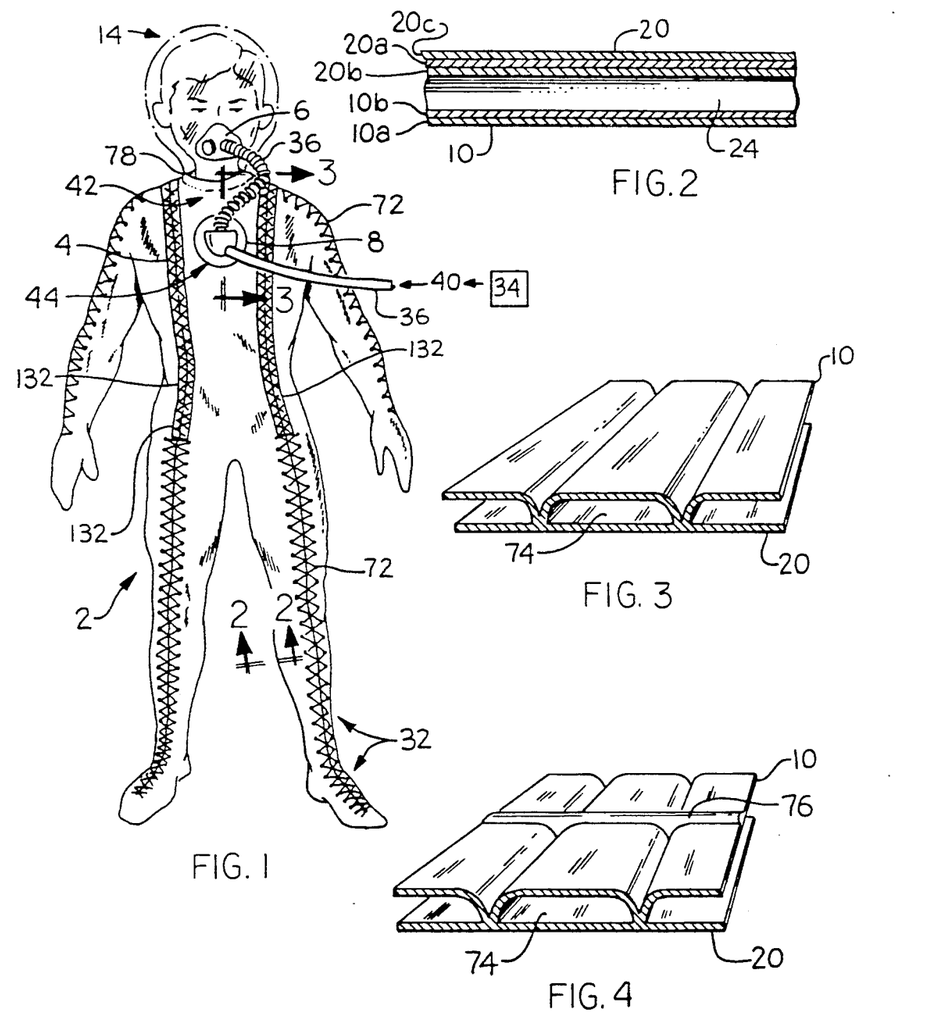
FIG. 1 is a front view of an anti-g system constructed according to the present invention.
FIG. 2 is a cross-sectional view of a portion of the suit of FIG. 1, taken at line 2—2.
FIG. 3 is a cross-section of a modified suit, wherein channels are formed in the suit.
FIG. 4 is a cross section of a modified suit similar to FIG. 3 wherein ducts are provided to allow fluid communication between channels.

Referring to the drawings more particularly by reference numbers, FIG. 1 shows a simple anti-g system 2, having a suit 4, a breathing mask 6 and a breathing regulator 8. As shown in FIG. 2, the suit 4 has an inner liner 10, with an inner surface 12 facing the body of the user 14, and an outer surface 16 facing the inner surface 18 of an outer liner 20. There is a space 22 between the inner 10 and outer liners 20 that defines a compartment 24 coextensive with the user's body 14. The compartment 24 is filled with a fluid, that exerts a hydrostatic pressure on the skin of the user 14. The density of the fluid should be approximately the same as the density of the user's blood, so that the hydrostatic pressure of the fluid is always approximately equal to the hydrostatic pressure of the user's blood. This equilibrium of forces, prevents the blood from expanding the skin, and "pooling" in the dependent body parts.

The regulator 8 is attached to a first source of pressurized breathing gases 34, by an input air hose 36. An output air hose 38 is attached to the breathing mask 6 and the regulator 8, to allow breathing gases 40 to flow from the regulator 8 to the breathing mask 6. The user 14 wears a breathing mask 6 that is capable of providing breathing gases 40 to the user 14. This pressurized breathing gas system 42 allows the user 14 to breath from a source 34 of pressurized breathing gases 40.

As shown in FIG. 2, the inner liner 10 may be constructed from nylon fabric 10a, preferably 50 to 200 Dernier, impregnated with urethane 10b to make the inner liner 10 impermeable. The outer liner 20 may be constructed with a cloth 20a, made from a light, strong, flexible, nondistensible material such as the product sold under the Trademark KEVLAR by E. I. DuPont de Nemours & Co., woven with a fire resistant material such as PBI, and stainless steel fibers which add strength and provide electromagnetic impulse (EMI) protection. The KEVLAR may be of sufficient thickness to act as an armor protector, to prevent bullets from penetrating the suit 4. The cloth 20a is impregnated with urethane 20b to make the outer liner 20 impermeable, and the outer surface of the cloth 20a can be covered by a thin layer of hard resilient material 20c such as the product sold under the Trademark MYLAR by E. I. DuPont de Nemours & Co., which could be aluminized to provide additional chemical and EMI protection. The MYLAR could be white in color, to provide reflective radiative thermal protection. The MYLAR provides additional chemical and biological protection, and allows the suit 4 to be easily scrubbed after exposure to such hazardous environments. The outer liner 20 can also be covered with an anti-infrared detection coating. The outer liner 20 preferably includes adjustable closure means, such as the laces 72 that are incorporated into the suit as shown in FIG. 1. The laces 72 allow adjustment of the suit 4, enabling different sized users 14 to wear the suit 4.

To provide additional structural integrity, the outer liner 20 can be attached to the inner liner 10 along the length of the suit 4, forming a plurality of channels 74 as shown in FIG. 3. To allow fluid communication between channels 74, channel ducts 76 can be incorporated into the outer liner 20, by not attaching the outer liner 20 to the inner liner 10 at various areas along the length of the suit 4 as shown in FIG. 4. The suit 4 is sealed by attaching the outer liner 20 to the inner liner 10 around the collar 78 of the suit 4.

To reduce the weight of the suit 4, the space 22 between the liners 10 and 20, should not be much wider than 2 cm. The hydrostatic fluid pressure in the compartment 24 is a function of acceleration and height, not thickness, therefore the compartment 24 may be as thin as the viscosity of the fluid 26 will allow. To further reduce weight, the inner 10 and outer 20 liners can be attached in various areas, such as the buttocks 80 and abdomen 82, to prevent fluid 26 from entering these regions, see FIGS. 5 and 6. Because the outer liner 20 is nondistensible, the fluid 26 at the same height on the opposite unattached portions of the suit 4, will apply pressure on the user 14 in the "attached" portions of the suit 4.

Figure 5:
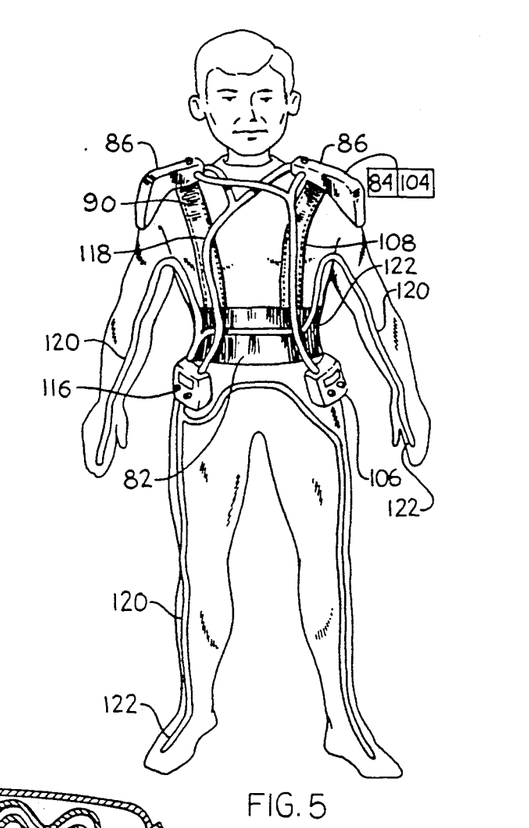
FIG. 5 is a front view of a g-suit with epaulet fluid reservoirs, thermal control means and a harness.
Figure 6:
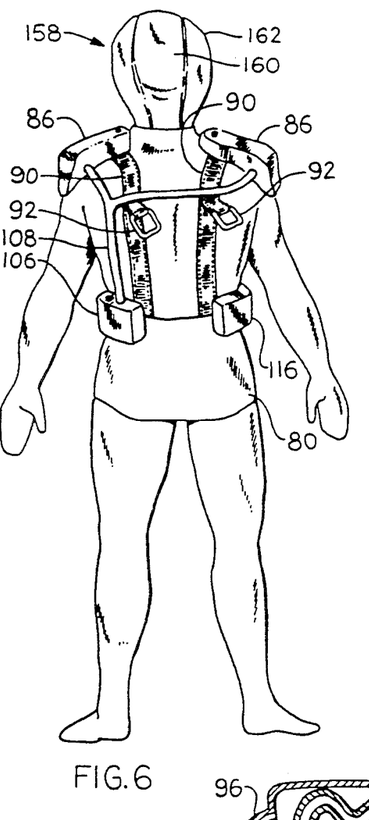
FIG. 6 is a back view of a g-suit similar to FIG. 5, further including a foam hood and an additional strip of fluid.
Figures 7, 8, 9, 9A:
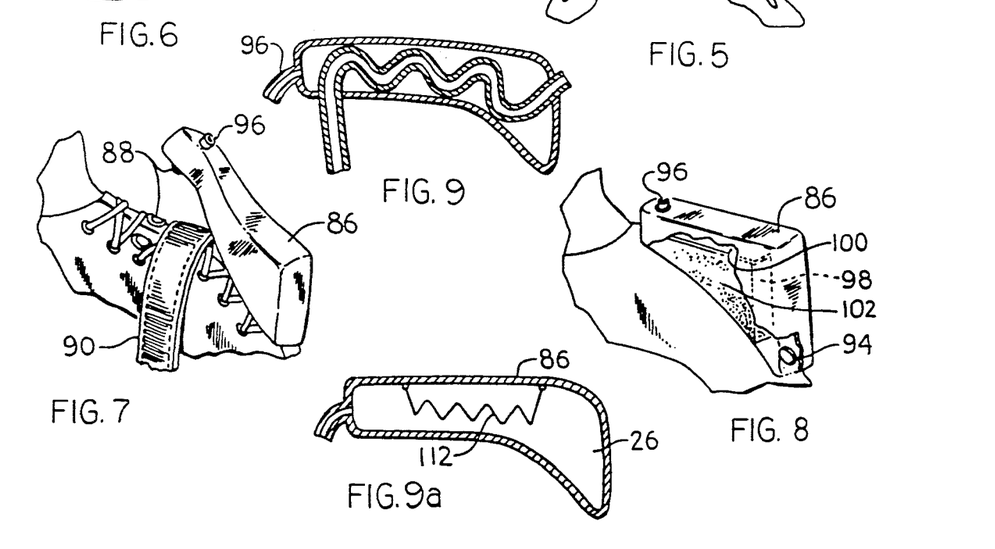
FIG. 7 is an enlarged view of the epaulet of FIG. 5 showing an attachment method.
FIG. 8 is a broken view of the epaulet of FIG. 5, showing an elevating shoulder pad beneath the epaulet.
FIG. 9 is a cross-sectional view of the epaulet of FIG. 5, with a supply conduit running through the epaulet, wherein the fluid in the supply conduit exchanges heat with the fluid in the epaulet.
FIG. 9a is an enlarged cross-sectional view of a modified epaulet similar to FIG. 5, wherein the epaulet has a heating element.

To compensate for changes in the volume of the compartment 24, (when the user sits, breaths or bends a joint) the suit 4 should have a fluid reservoir 84, shown in block diagram in FIG. 5, that is in fluid communication with the compartment 24. To make the suit 4 self contained, the fluid reservoir 84 can be a pair of inflatable epaulets 86 attached to the shoulder of the suit 4, as shown in FIGS. 5 and 6. Each epaulet 86 can be made from a flexible "bag" material, to allow it to supply or receive fluid, with any change in the volume of the compartment 24. The epaulets 86 may be connected to the suit 4 by means such as stitching, releasably interlocking material hook and loop type fasteners, such as sold under the trademark VELCRO, for example, zippers or the like. FIG. 7 shows that the epaulet 86 can be detachably connected to the suit 4 with snap ons 88. By attaching the epaulet 86 with detachable means, a harness 90 can fit snugly over the user 14 without interfering with the epaulets 86. The harness 90 may be sewn into the suit 4 as shown in FIGS. 5 and 6, with buckles 92 to allow attachment to a seat or parachute bag. FIG. 8 shows a first inlet port 94 in the outer liner 20 that allows fluid communication between the epaulet 86 and the compartment 24. A second fluid inlet port 96 can be provided in the epaulets 86 to allow the suit 4 to be filled or drained with fluid 26. Foam shoulder pads 98 can be attached to the inner liner 10, to elevate the epaulets 86 to allow a suit 4, that extends onto the neck, to be filled with fluid 26. As shown, the shoulder pads 98 include a rigid base plate 100 attached to a foam rubber pad 102.

To protect the body from adverse outside temperatures a heat exchanger 104, shown in block diagram in FIG. 5, can be operatively connected to the suit 4. The heat exchanger 104 can be separate from the suit 4, or to keep the suit 4 self-contained, a portable heater/chiller 106 can be attached to the waist of the suit 4, as shown in FIG. 5. The heater/chiller 106 is capable of providing heat or refrigeration. The heater/chiller 106 has a supply conduit 108 that runs up the Suit 2, through the epaulets 86, and returns back to the heater/chiller 106. The heater/chiller 106 is a closed loop system with a cooling fluid 110, that exchanges heat with the suit fluid 26 in the epaulets 86, see FIG. 9. To facilitate heat flow between fluids 26 and 110, the supply conduit 108 in the epaulets 86 should be constructed from highly conductive thin-walled tubing such as copper. In the alternative, a heating element 112, FIG. 9a, or a thermoelectric junction plate 114, FIG. 9b, can be incorporated into the epaulets 86, and attached to a power supply not shown. The power supply should be capable of reversing the polarity of the voltage being applied to the thermoelectric junction plate 114, such that the plate 114 heats the fluid 26 at one voltage polarity and cools the fluid 26 at another polarity.

Figure 9B:
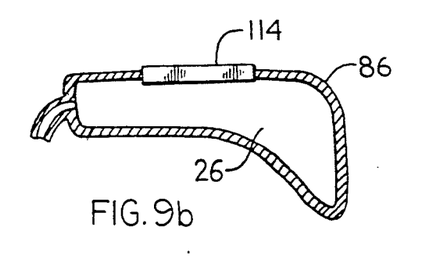
FIG. 9b is an enlarged cross-sectional view of a modified epaulet similar to FIG. 5 wherein the epaulet has a thermoelectric junction plate.

A pump 116 is attached to the waist of the suit 4 or in the alternative the pump 116 may be placed within the epaulets 86. The pump 116 circulates the fluid 26 throughout the body of the suit 4. When heating elements 112 and 114, such as those shown in FIG. 9a and 9b are used, the pump 116 pumps the fluid 26 through the heat exchanger, either 104 or 106. When the two loop heat exchanger of FIG. 9 is used the pump 116 pumps the fluid 26 throughout the user 14, and a separate pump, not shown, pumps the cooling fluid 110 through the epaulet 86 and the heat exchanger 104. A fluid 26 supply hose 118 is attached from the epaulets 86 to the pump 116, with outlet hoses 120 extending from the pump 116 to suit inlet ports 122 in the hand, feet and abdomen portions of the suit 4. The pump 116 circulates the fluid 26 from the epaulets to the inlet ports 122. All hoses, 108, 118 and 120, are attached to or formed within the suit 4, to prevent them from becoming entangled or detached from the suit 4. To facilitate equal distribution of fluid 26 in a suit 4 with the longitudinal channels 74 of FIG. 3, manifolds 124 are incorporated into the suit 4, by leaving the outer liner 20 unattached to the inner liner 10 at the hand, feet and collar portions of the suit 4, as shown in FIG. 10.

Standard $CO_2$ cartridges 126 may be added to inflate the upper portion of the suit 4, in the event the user becomes immersed in a body of water. A pressure relief valve 128 is incorporated into the suit 4, to allow fluid 26 to escape when $CO_2$ is added to the compartment 24. Both the cartridge 126 and relief valve 128 are manually actuated. Although other gases may be used, $CO_2$ is desirable because it is a thermal insulator. The suit 4 can have an inflatable collar 130 in fluid communication with the $CO_2$ cartridge 126. When the collar 130 is inflated it prevents water from flowing in between the inner liner 10 and the skin 28 of the user 14. Once the $CO_2$ is added and the excess fluid 26 is purged from the upper region of the suit 4, the user's 14 upper body will be kept afloat.

Figure 10:
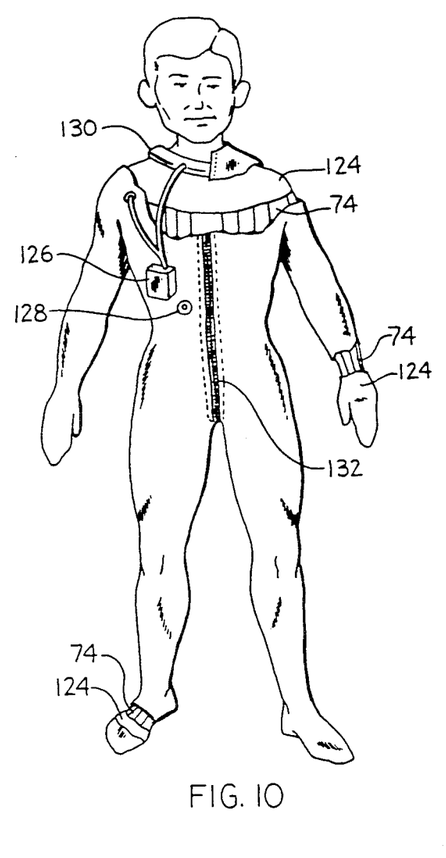
FIG. 10 is a front view of a modified g-suit, broken away to show manifolds and an inflatable collar incorporated into the suit.
Figure 11:
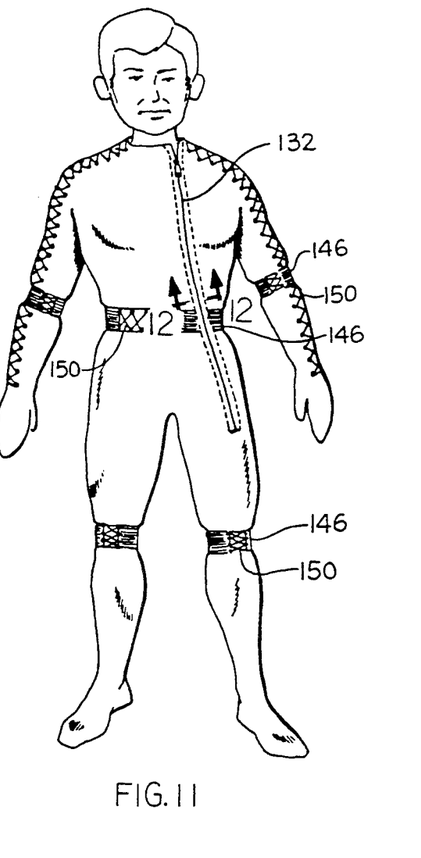
FIG. 11 is a front view of a modified g-suit with an offset zipper and, elastic knee, elbow and stomach bands.
Figure 12:
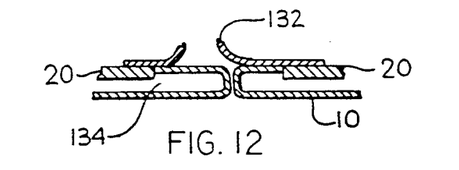
FIG. 12 is a cross-section taken at line 12—12 of FIG. 11, of a zipper sewn into the suit, in an open condition.
Figure 12A:
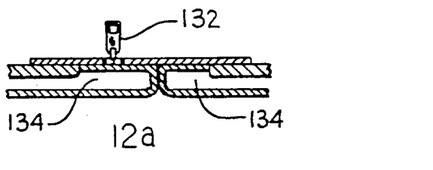
FIG. 12a is a cross-section similar to FIG. 12 with the zipper in a closed condition.

FIGS. 1, 10 and 11 show how zippers 132 can provide easy access into the suit 4. The zipper 132 can be sewn onto compartment zipper ends 134, that are formed by attaching the inner 10 and outer 20 liners as shown in FIG. 12. The compartment zipper ends 134 come in contact with each other, to provide hydrostatic pressure around the entire body, without gaps at the zipper 132, see FIG. 12a. The zipper 132 is offset from the compartment zipper ends 134, to prevent the compartment zipper ends 134 from bulging through the zipper 132.

Figure 13:
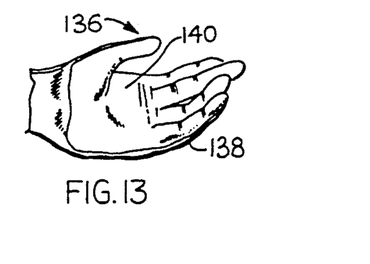
FIG. 13 is a view of the hand portion of a g-suit.
Figure 13A:
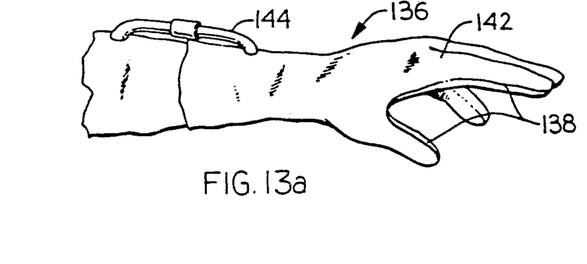
FIG. 13a is a view of a glove attached to a g-suit.

To allow free grasping movement, a glove 136 can be formed into the suit 4, by attaching the inner 10 and outer 20 liners along the circumference 138 of the hand portion of the suit 4, as shown in FIG. 13a. This prevents fluid 26 from entering the ventral portion 140 of the hand. Because the outer liner 20 is nondistensible, any increase in fluid 26 pressure on the unattached dorsal part 142 of the hand will tighten the outer liner 20 around the ventral portion 140 of the hand, providing pressure throughout the hand. The glove 136 can be a separate article as shown in FIG. 13a, in which case a supply hose 144 can be attached through the outer liner 20 to communication of the fluid 26 between the glove 136 and the rest of the suit 4.

Figure 14:
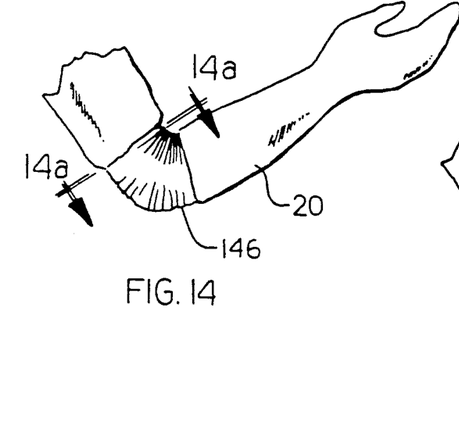
FIG. 14 is an enlarged view of the elbow portion of FIG. 11, showing the elastic bands without the laces.
Figure 14A:
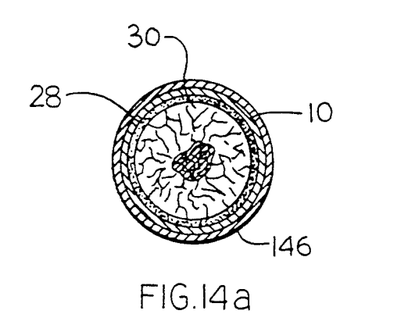
Figure 15:
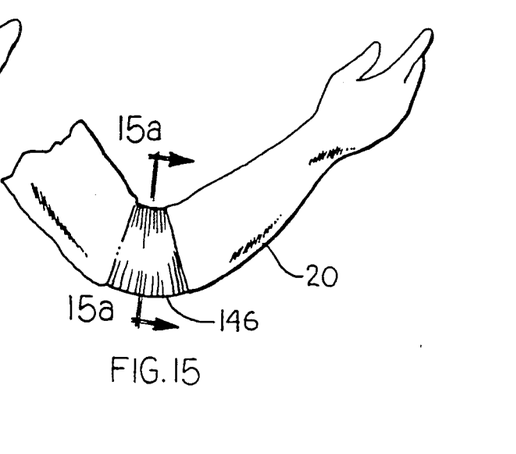
FIG. 15 is a view of the elastic band shown in FIG. 14, wherein the fluid is subjected to an acceleration greater than 1 g.
Figure 15A:
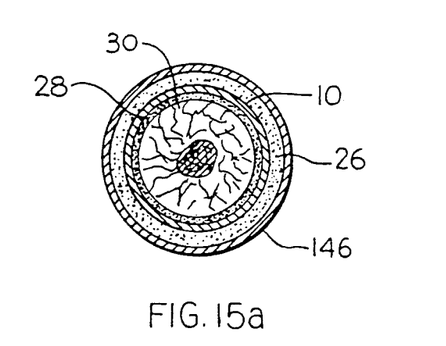
Figure 16:
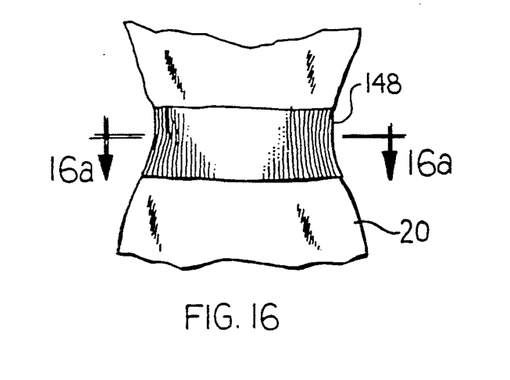
FIG. 16 is an enlarged view of the abdomen portion of FIG. 11, showing a collapsible elastic waist band.
Figure 16A:
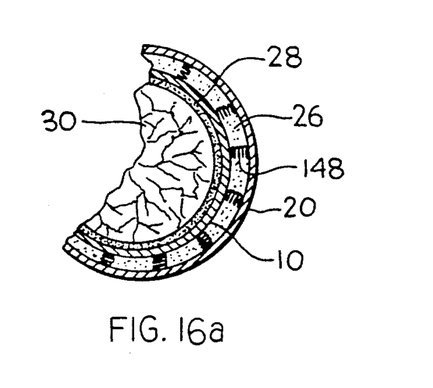

Elastic bands 146 may be sewn into the elbow, knee and abdomen portions of the suit 4, as shown in FIG. 11. The elastic bands 146 contract the outer liner 20, pushing fluid 26 out of the elbow, knee and abdomen portions of the suit 4, see FIGS. 14 and 14a. This allows the user 14 to move these joints without having to expend additional energy in moving the fluid 26 out of these areas. The elasticity of the elastic bands 146 shall be such, that when the user 14 is subjected to an acceleration greater than 1 g, the hydrostatic pressure of the fluid 26 expands the outer liner 20, allowing fluid 26 to flow into the elbow, knee and abdomen portions of the suit 4, see FIGS. 15 and 15a. In the alternative, as shown in FIGS. 16 and 16a, elastic stretch springs 148 can be attached to the inner 10 and outer 20 liners. The stretch springs 148 contract the outer liner 20 and reduce the width of the compartment 24. When the fluid 26 pressure increases due to g-forces, the outer liner 20 expands. When the elastic bands 146 or stretch springs 148 are used, the outer liner 20 must be distensible in the required areas to allow the outer liner 20 to contract or expand. To prevent overexpansion of the outer liner 20, laces 150 may be sewn into the suit 4, as shown in FIG. 11.

Figure 17:
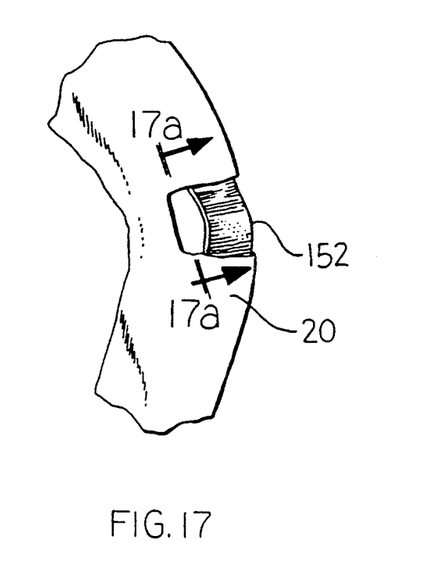
FIG. 17 is a view of a modified suit, wherein an elastic band is sewn into the outer liner of the knee portion of the suit.
Figure 17A:
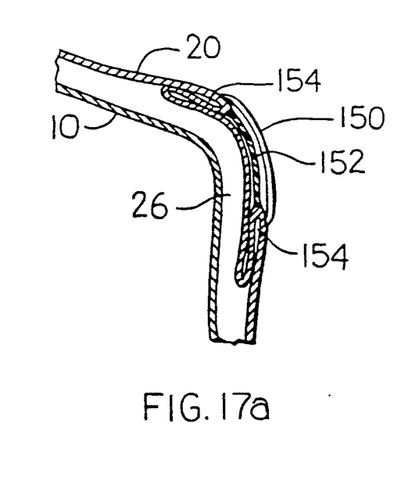
Figure 18:
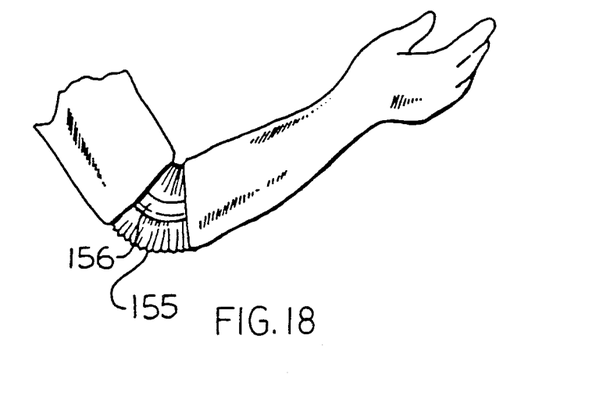
FIG. 18 is a view similar to FIG. 14, showing a fluid supply hose that allows fluid communication between the forearm and the rest of the suit, wherein the elbow portion of the suit does not contain fluid.

FIGS. 17 and 17a show an elastic band 152 sewn into eye lids 154 formed in the outer liner 20 of the suit 4. When the user 14 sits down, the elastic band 152 expands, storing potential energy. When the user 14 stands up, the elastic band 152 contracts, releasing the potential energy. This additional energy helps alleviate the strain on the user 14 in lifting the weight of the fluid 26, to enable longer suit 4 use with less fatigue. The eye lid elastic bands 152 may be used in conjunction with the contracting elastic bands 146, to provide maximum user 14 comfort. Another embodiment of the joints is shown in FIG. 18, a sleeve 155 is attached to the suit 4 to prevent fluid 26 from entering the elbow or knee portions of the suit 4, and continuous compartment 24 fluid communication is provided by an elastic band supply hose 156. The sleeve 155 may be an elastic band 146 or an attached portion similar to that of the abdomen 82 shown in FIG. 5.

It may be desirable to have a column of fluid 26 up to the top of the user's head 158, to provide a height of fluid 26 and corresponding hydrostatic pressure 68 equal to the height and pressure of the user's blood 30. As shown in FIG. 6, an additional strip 160 may be extended from the collar 78, to the top of the head 158. The strip 160 can be incorporated into a protective foam hood 162 that extends from the collar 78 of the suit 4. In this configuration the fluid reservoir 84 should be at an elevation above the user's head 158.

Figure 19:
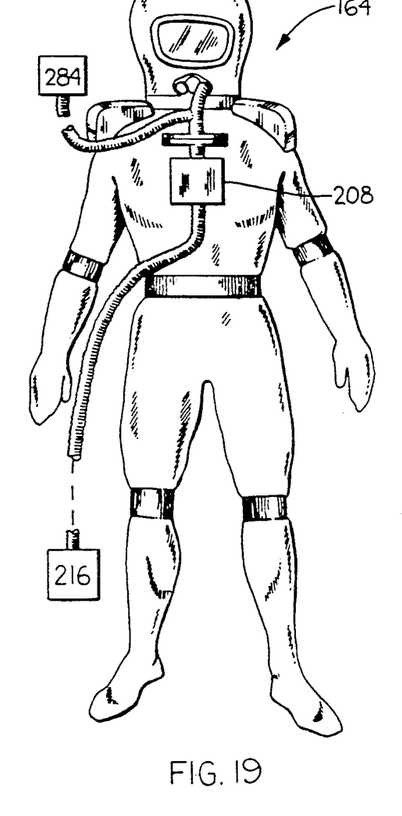
FIG. 19 is a front view of a g-suit with a pressurized breathing system incorporated into the suit.
Figure 20:
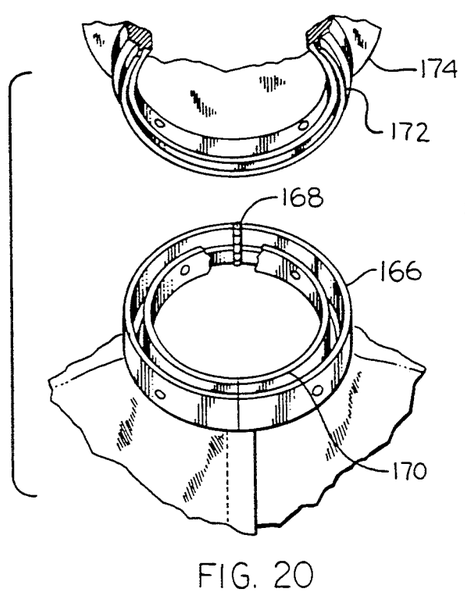
FIG. 20 shows a collar attached to the g-suit of FIG. 19.
Figure 21:
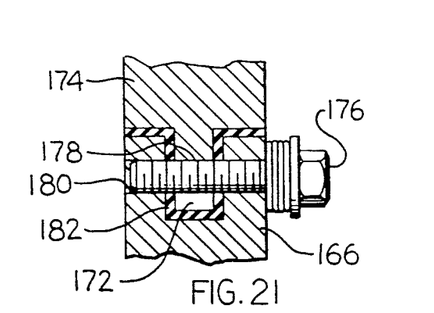
FIG. 21 is a cross-sectional view of a helmet attached and sealed to the collar of FIG. 20.

To provide chemical, biological and radiation protection, a sealed breathing system 164 as shown in FIG. 19 can be provided to supply the user 14 with uncontaminated breathing gases 40. FIG. 20 shows a rigid collar 166 attached and sealed to the suit 4. The suit 4 could be sewn or formed onto the collar 166, or the collar 166 could be mounted on top of the suit 4. In one embodiment, the inner diameter of the collar 166 should be larger than the user's head 158, to allow the user 14 to put on the suit 4. In the alternative, the collar 166 could have a hinge 168, to allow the collar 166 to separate into two sections. The collar 166 has a groove 170 along the circumference that mates with the lip 172 of a helmet 174. It is desirable to make the helmet 174 transparent, to provide the user 14 with outside visibility. FIG. 21 is a cross-sectional view of the helmet 174 fastened to the collar 166 with a spring retained screw 176, that is inserted through an aperture 178 in the helmet lip 172 and received by a threaded aperture 180 in the collar 166. There are four screws 176 equally spaced around the circumference of the collar 166. A seal 182 is attached to the collar 166 or helmet 174, to prevent fluid communication between the inside of the helmet 174 and the environment.

Figure 22:
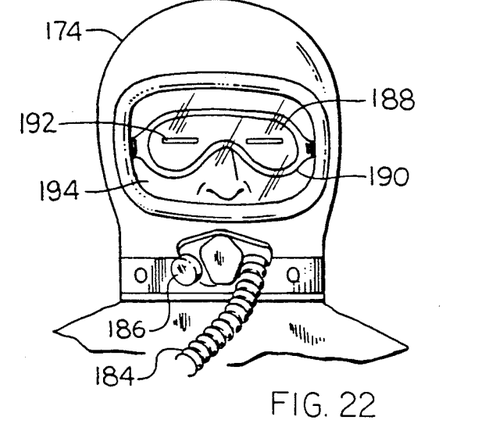
FIG. 22 is an enlarged view of a person wearing the pressurized breathing helmet of FIG. 19.

The user 14 is provided with breathing gases 40 which are supplied through a first air hose 184 attached to the helmet 174, as shown in FIG. 22. To allow exhalation from the helmet, a one-way check valve 186 is inserted in the helmet 174. When the user 14 exhales, the pressure within the helmet 174 is greater than the pressure of the breathing gases 40 supplied through the first air hose 184. When this occurs the check valve 186 opens, discharging the user's 14 exhaust gases.

Figures 23, 25:
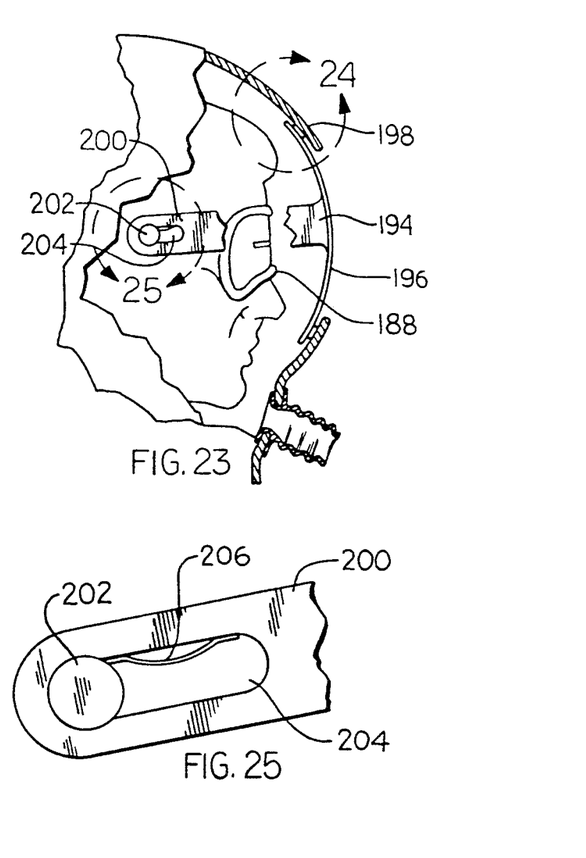
FIG. 23 is a partially cut away side view of FIG. 22, showing a movable face plate.
FIG. 25 is an enlarged sectional view of FIG. 23 showing a position biasing spring.
Figure 24:
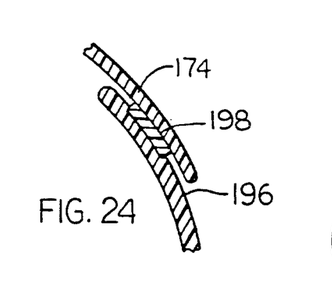
FIG. 24 is an enlarged sectional view of FIG. 23 showing the seal of the face plate.

Because the eyes are soft unsupported membranes, pressurized gases 40 (particularly at g loads) will push the eyeballs further into the head 158. This causes visual compromise and blood drainage from the eyes, leading to user 14 blackout. To protect the eyes, goggles 188 with sealant means 190 such as foam rubber, are worn by the user to reduce the amount of gas pressure 70 on the eyes. Standard flash protection means 192 can be incorporated into the goggles 188, to prevent flash blindness. Communication means such as headphones and a microphone, not shown, can be attached to the helmet 174 or into the foam hood 162, to allow the user 14 to communicate with an outside source. FIG. 23 shows a movable face plate 194, which allows the user 14 to have access to his face. The face plate 194 has a front transparent shield 196 with seals 198 at the outer edges to prevent fluid communication between the inner helmet 174 and the environment, see FIG. 24. Because the helmet 174 is supplied with pressurized breathing gases 40 at a pressure greater than ambient pressure, the breathing gases 40 will push the shield 196 against the helmet 174, enhancing the sealing and insuring an outward flow of gases in the event that the seal is compromised. Extending from the shield 196 are side members 200 that are pivotally mounted to the inside of the helmet 174. The helmet 174 has a pin 202 that travels along a slot 204 in the side members 200. As shown in, FIG. 25, the slot 204 has a spring 206 that will bias the pin 202 into either one of two positions, at the ends of the slot 204. To obtain facial access, the shield 196 is pushed in and then rotated. To return the shield 196, it is rotated back and then pulled out.

In conjunction with the sealed breathing system 164, the fluid 26 can contain additives that protects the user 14 from radiation, chemical and biological contaminants. For instance, filling the compartment 24 with barium iodide (BaI$_2$) would shield the user 14 from exposure to radiation and EMI. Antimicrobials can be added to the fluid 26 to prevent contamination from biological intruders such as viruses and bacteria. Antitoxins may be added along with nerve gas absorbing agents such as acetlycholinesterase. A lubricant such as sudless soap can be added to the fluid 26, to reduce the amount of friction between the suit liners 10 and 20, and fluid 26, resulting in less energy expenditure by the user 14 during body movement. The outer liner 20 can be covered or woven with materials that prevent chemical or biological contamination of the body.

Figure 26:
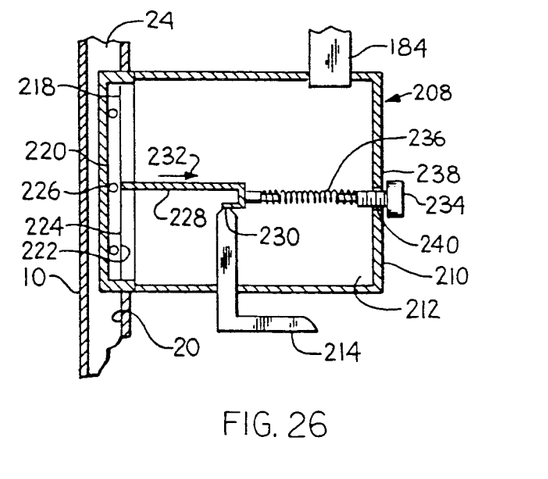
FIG. 26 is a cross-sectional view of a regulator with means to allow the user to vary the pressure of the breathing gases.

One type of regulator 208 is diagrammatically shown in FIG. 26, which allows the user 14 to manually control the pressure of the breathing gas 40 being supplied to the user 14. The regulator 208 has a housing 210 with a plenum chamber 212. The first air hose 184 and a second air hose 214 are attached to the housing 210 and are in gaseous communication with the plenum chamber 212. The second air hose 214 is in gaseous communication with a primary source of pressurized breathing gases 216, the first air hose 184 is in fluid communication with the user 14, see FIG. 19. When the suit 4 is to be used to counteract the effects of g-loads, the breathing gases 40 in the primary source 216, should be pressurized to a level approximately equal to or greater than the hydrostatic fluid pressure 68 on the user's thoracic region 44, at the maximum g-load to be seen by the user 14. This is true whether the user 14 wears a helmet 174 or a breathing mask 6.

The regulator 208 includes a diaphragm 218 attached to a regulator ring 220 which is connected to the outer liner 20 of the suit 4. The diaphragm 218 has a first surface 222 exposed to the plenum chamber 212, and a second surface 224 in fluid communication with the fluid 26 in the compartment 24. The regulator ring 220 prevents the inner liner 10 from collapsing and cutting off fluid 26 communication between the compartment 24 and the diaphragm 218. The regulator ring 220 is essentially a circular cup with a plurality of holes 226 spaced around its circumference to allow fluid 26 communication between the diaphragm 218 and the compartment 24.

A valve 228 is connected to the diaphragm 218. When the forces across the diaphragm 218 are equal, the valve 228 covers the inlet port 230 of the second air hose 214, preventing the pressurized breathing gases 40 from entering the plenum chamber 212. When the user 14 inhales, he reduces the pressure in the plenum chamber 212 below the pressure of the fluid 26 on the diaphragm 218. When the fluid 26 pressure is greater than the breathing gas 40 pressure in the plenum chamber 212, the fluid 26 moves the diaphragm 218 toward the plenum chamber 212, moving the valve 228 in the direction of the arrow 232 as shown in FIG. 26. This movement of the valve 228 opens the inlet hose port 230, which allows pressurized breathing gases 40 to enter the plenum chamber 212 and flow to the user 14. The pressurized breathing gases 40 will continue to flow, until the pressure of the gases 40 in the plenum chamber 212 is equal to the fluid 26 pressure, at which point the pressurized breathing gases 40 push the diaphragm 218 back to its original position, moving the valve 228 and closing the inlet port 230.

When the suit 4 is subjected to g-loads, the hydrostatic fluid pressure in compartment 24 increases, requiring a greater breathing gas pressure in plenum chamber 212 to return the diaphragm 218 and close the valve 228. This results in a higher breathing gas pressure that is supplied to the user 14, helping the user to overcome the increased fluid pressure being applied to the user's thoracic region 44 during g-loads.

It is preferable to have the outer liner 20 essentially nondistensible, to prevent the suit 4 from swelling in the dependent body parts and requiring additional fluid 26, when subjected to g-loads. It is also desirable to make the outer line 20 impermeable and flexible to allow the user 14 to move freely. The inner liner 10 should be impermeable, flexible and distensible, so that when fluid 26 is added to the compartment 24, the fluid 26 induces contact between the inner liner 10 and the skin, preventing the creation of any gaps or voids between the skin and inner liner 10. This insures that pressure will be exerted on the areas of the user's body that is covered by the suit 4.

To allow the user 14 to adjust the pressure of the breathing gases 40 being supplied to him, a first variable knob 234 is attached to a first variable spring 236, which can be attached to the valve 228 as shown in FIG. 26. The first variable knob 234 has a threaded shank 238 that is received by and extends through a threaded aperture 240 in the housing 210. Rotating the first variable knob 234 varies the length of the spring 236, which changes the amount and possibly the direction of the force being exerted by it on the valve 228. This change of force, varies the amount of gas pressure 40 required to open and close the inlet port 230, changing the pressure of the breathing gases 40 supplied to the user 14.

When the user 14 is subjected to low ambient pressures, it is desirable to maintain the pressure of the breathing gases 40 being supplied to the user 14. The pressure within the plenum chamber 212 and of the breathing gases 40 being supplied to the user 14, is equal to the sum of the hydrostatic fluid 26 pressure at the user's 14 chest and the ambient pressure. When the ambient pressure decreases, so does the pressure of the breathing gas 40 being supplied to the user 14. To compensate for any changes in ambient pressure a modified regulator 242 with an aneroid chamber 244 can be constructed as diagrammatically shown in FIG. 27. The aneroid chamber 244 expands with any decrease in ambient pressure, biasing the valve 228 and increasing the pressure of the breathing gases 40 being supplied to the user 14. The chamber 244 insures a minimum predetermined breathing gas 40 pressure.

Figure 27:
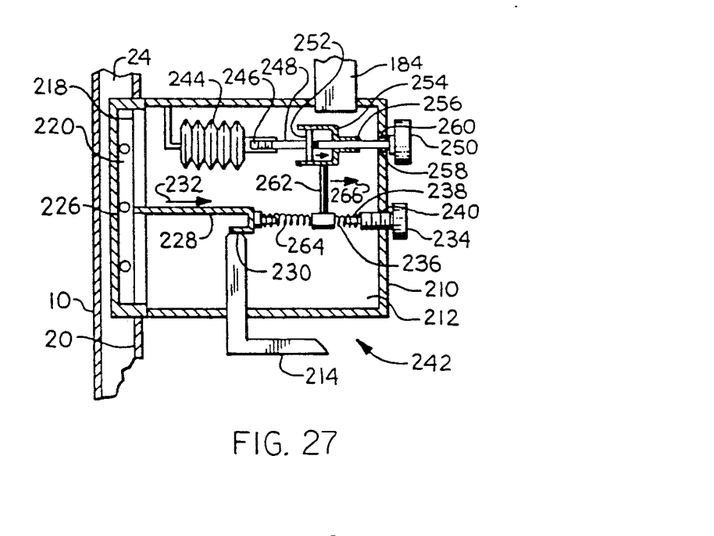
FIG. 27 is a cross-sectional view of a regulator with means to vary the pressure of the breathing gases as function of ambient pressure.

The aneroid chamber 244 housing has a threaded aperture 246, that receives a threaded portion of the shank 248 of a second variable knob 250. The knob shank 248 has a flange 252 that fits within an aneroid cylinder 254. The shank 248 is guided by a sleeve 256 extending from the aneroid cylinder 254, that prevents bending of the shank 248. The second variable knob 250 is inserted through an aperture 258 in the regulator housing 210. The aperture 258 has a seal 260 to prevent fluid communication between the plenum chamber 212 and the environment. The aneroid cylinder 254 is attached to a cylinder bar 262, which is connected to the first variable spring 236 and a second variable spring 264. The springs 236 and 264, are connected in series with the valve 228 and the first variable knob 234. The aneroid cylinder bar 262 should be attached between the two springs 236 and 264, to allow the bar 262 to move forward or backward.

In operation, the aneroid chamber 244 expands when the ambient pressure and corresponding plenum 212 pressure decrease. The chamber 244 expansion moves the shank flange 252 until it comes in contact with the bottom of the aneroid cylinder 254, pushing the aneroid cylinder 254, which moves the springs 236 and 264 in the direction of the arrow 266 as indicated in FIG. 27. The spring movement will bias the valve 228 toward the open position, such that a greater breathing gas 40 pressure is required to close the inlet port 230, resulting in an increase of breathing gas 40 pressure that is supplied to the user 14. The ambient pressure at which the aneroid chamber 244 functions can be varied by rotating the second variable knob 250, screwing the shank 248 into or out of the aneroid chamber aperture 246. This moves the relative position of the flange 252, varying how much aneroid chamber 254 expansion or change in ambient pressure must occur, before the flange 252 contacts and moves the aneroid cylinder 254.

Figure 28:
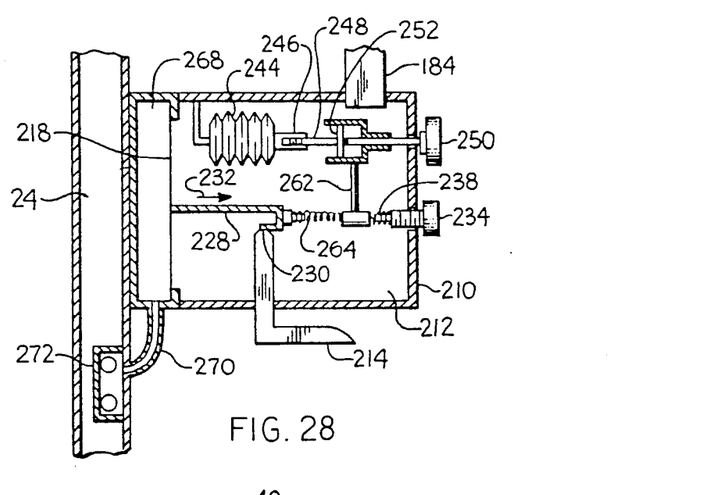
FIG. 28 is a view of a movable pressure regulator, attached to an extension chamber incorporated into a g-suit.

In addition to the first variable knob 234, the pressure of the breathing gases 40 delivered to the user 14, can be varied by moving the regulator 242 along the thoracic region 44 of the suit 4, changing the hydrostatic fluid 26 pressure being applied to the diaphragm 218. This can be done by attaching the diaphragm 218 and pressure regulator 242 to an extension chamber 268, with an extension hose 270 that provides fluid 26 communication between the chamber 268 and the compartment 24, as shown in Fig. 28. A chamber regulator ring 272 is attached to the suit 4 at the extension hose 270 inlet, preventing the inlet 270 from being blocked by the inner liner 10.

Figure 29:
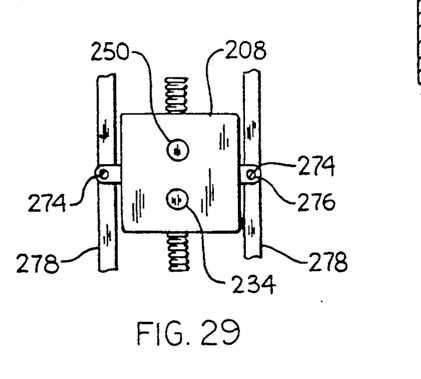
FIG. 29 is a view of a movable pressure regulator, attached by screws to strips incorporated into a g-suit.

As shown in FIG. 29, the chamber 268 can be connected to the suit 4 by two screws 274, inserted and retained by two threaded apertures 276 in the regulator housing 210. The screws 274 clamp the housing 210 to two metal strips 278 attached to the suit 4. The regulator 208 can be moved by unlocking the screws 274, and sliding the regulator 242 up or down the metal strips 278 in the user's thoracic region 44.

Figure 30:
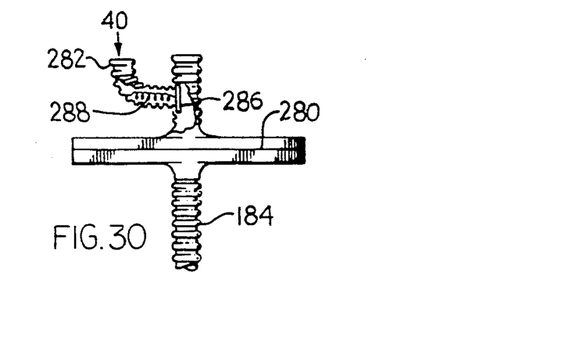
FIG. 30 is a view of a back-up air supply, having an air permeable, liquid nonpermeable membrane in the air hose of the pressurized breathing means.

In the event the diaphragm 218 fails or leaks, an air permeable, liquid nonpermeable membrane 280, preferably made of an expanded polytetrafluorethylene (PTFE), such as the product sold under the Trademark GORTEX by W. L. Gore, Inc., can be inserted into the first air hose 184 to prevent inhalation of the fluid 26. The membrane 280 should be larger in diameter than the hose 184, to allow the user 14 to comfortably inhale without having to overcome high fluid friction of the breathing gases 40 as it passes through the membrane 280. To supply a back-up source of breathing gases 40, a third air hose 282 is attached to the first air hose 184, providing gaseous communication between the helmet 174 and a secondary source of breathing gases 284. As shown in FIG. 30, an inlet valve 286 is attached by a spring 288 to the third supply hose 282. The inlet valve 286 is biased by the spring 288 such that it prevents gaseous communication between the third air hose 282 and the first air hose 184. If the regulator 242 fails, the user 14 can turn on the secondary pressurized gas source 284. When the user 14 inhales, he reduces the pressure in the first air hose 184, which in combination with the pressure from the gases 40 in the third air hose 282, opens the inlet valve 286. The valve 286 remains open until the pressure in the first air hose 184 approximately equals the pressure in the third air hose 282.

Figure 31:
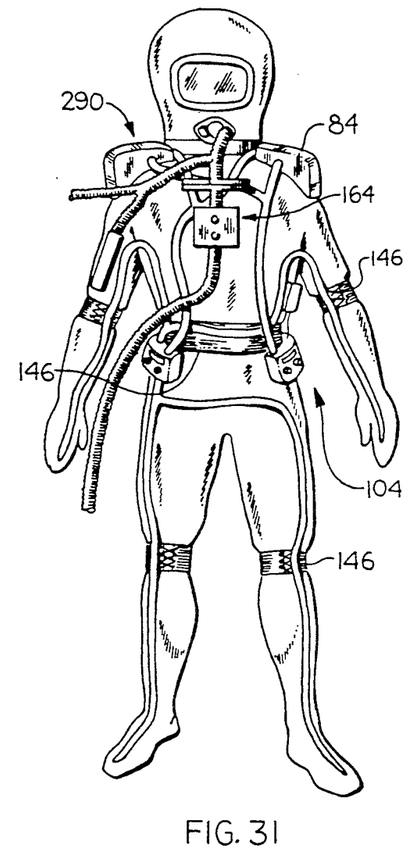
FIG. 31 is a view of a fully assembled, thermally regulated fluid filled g-suit, with pressurized breathing means.

FIG. 31 shows a completely assembled holistic personal protection system 290, that has regulated pressurized breathing 164, temperature control 104, elastic bands 146, and a reservoir 84, containing a fluid 26 that provides protection against radiation, chemical and biological contaminants. Because the suit compartment 24 is thin, the anthropomorphic protection system 290 is light enough to use in an aircraft. Complete integration of a heat exchanger 104 and breathing means 164 with the suit 4, allows usage outside the cockpit. In addition, the regulator 242 and elastic bands 146 provide added user 14 comfort, to reduce fatigue and prolong the operation time of the suit 290.

What is claimed is:

1. A system that protects the body of a user of the system from the effects of acceleration, comprising:
   a) a suit having:

a flexible impermeable inner liner capable of conforming to the body of the user, said inner liner having an inner surface facing the body of the user, and an outer surface;

a flexible, impermeable outer liner having an inner surface facing said outer surface of said inner liner, at least a portion of said inner surface of said outer liner being spaced from said outer surface of said inner liner to define a compartment therebetween, said compartment having a width of approximately 2 centimeters or less to permit the suit to be relatively lightweight and capable of being supported solely by the body of the user;

b) a fluid within said suit compartment c) means for supplying pressurized breathing gases; and d) regulator means operatively connected to said fluid and said means for supplying pressurized breathing gases, for supplying breathing gases to the user, at a pressure about equal to the pressure of said fluid at the level of the user's lungs:

said suit providing a balanced counterpressure to acceleration forces by exerting pressure on substantially all body surface area underneath the suit, thereby reducing distension in the user's blood vessels and pooling of blood in the user's dependent body parts.

2. The system as recited in claim 1, wherein the outer liner is essentially nondistensible.

3. The system as recited in claim 1, wherein said suit covers the body of the user at least from the neck to the feet.

4. The system as recited in claim 1, further comprising at least one reservoir of said fluid, said reservoir being in fluid communication with said compartment, so that the level of said fluid is maintained within a predetermined range.

5. The system as recited in claim 4, wherein said reservoir is supported by at least one shoulder of the user.

6. The system as recited in claim 1, wherein said means for supplying pressurized breathing gases include a breathing gas permeable, fluid nonpermeable membrane, positioned between said regulator and the user, said membrane preventing said fluid from flowing to the user in the event that said fluid enters said regulator.

7. The system as recited in claim 1, wherein said means for supplying pressurized breathing gases include;

a) a collar attached and sealed to said suit;

b) a helmet attached and sealed to said collar;

c) a first air hose attached to said helmet and said regulator means, said first air hose providing gaseous communication between said regulator means and said helmet;

d) a source of pressurized breathing gases in gaseous communication with said regulator means; and e) valve means attached to said helmet, for releasing said breathing gases when the user exhales.

8. The system as recited in claim 1, wherein said fluid includes at least one component that absorbs radiation that is harmful to the user.

9. The system as recited in claim 1, wherein said fluid includes at least one component that neutralizes chemical agents that are harmful to the user.

10. The system as recited in claim 1, wherein said fluid includes at least one component that neutralizes biological agents that are harmful to the user.

11. The system as recited in claim 1, further comprising;

a) a heat exchanger operatively connected to said fluid; and b) a pump operatively connected to said fluid, said pump being capable of pumping said fluid into operative contact with said heat exchanger and then back through said suit.

12. The system as recited in claim 1, further comprising an elastic band attached to said outer liner in the elbow and knee portions of said suit, the elasticity of said bands is such that fluid is restricted from entering the elbow and knee portions of said suit when the user is subjected up to 1 g's, but the hydrostatic pressure of said fluid expands said bands when said user is subjected to accelerations greater than 1 g, allowing fluid to enter said compartment in the elbow and knee portions of said suit.

13. The system as recited in claim 1, further comprising elastic bands attached to the outer liner of the knee portion of said suit, whereby when said user sits down, the elastic bands expand storing potential energy, and when said user stands upright, said elastic bands contract releasing said potential energy, reducing the amount of energy the user must expend, to sit and stand while wearing said fluid filled suit.

14. The system as recited in claim 1, wherein said regulator means include;

a) pressure sensor means having;

a first operative connection with said fluid;

and a second operative connection with said breathing gases, said pressure sensor means sensing the differential pressure between said breathing gases being supplied to the user and the pressure of the fluid at the level of the user's lungs; and b) valve means for controlling the flow of said breathing gases to the user;

c) wherein said pressure sensor means is operatively connected to said valve means, for actuating said valve means and allowing breathing gases to flow to the user when said fluid pressure at the level of the user's lungs is greater than the pressure of the breathing gases being supplied to the user, whereby the user is supplied with said breathing gases at a pressure approximately equal to the pressure of said fluid at the level of the user's lungs.

15. The system as recited in claim 14, wherein said regulator means include manual control means operatively connected to said valve, for biasing said valve such that the user can vary the pressure of said breathing gases that are being supplied to the user.

16. The system as recited in claim 1, further comprising;

a) a pressurized gas cartridge attached to said suit, said cartridge being in fluid communication with said suit compartment;

b) means to allow the user to introduce said gas into said compartment;

c) a relief valve attached said suit; and d) means to allow the user to actuate said relief valve, so that said fluid shall be discharged from said suit when said gas is introduced into said compartment.

17. The system as recited in claim 1, wherein said inner and outer liners are attached at one or more locations on the body of the user, thereby eliminating the fluid compartment at said locations in order to further reduce the weight of the suit.

18. The system as recited in claim 1, wherein said compartment is as thin as the viscosity of said fluid permits.

19. A system that protects the body of a user of the system from the effects of acceleration, comprising:
a suit having:
- a flexible impermeable inner liner capable of conforming to the body of the user, said inner liner having an inner surface facing the body of the user, and an outer surface;
- a flexible, impermeable substantially nondistensible outer liner having an inner surface facing said outer surface of said inner liner, at least a portion of said inner surface of said outer liner being spaced from said outer surface of said inner liner to define a compartment therebetween, said compartment being as thin as is permitted by the viscosity of said fluid, in order that the suit may be relatively lightweight and capable of being supported solely by the body of the user;
b) a fluid within said suit compartment;
c) at least one reservoir supported by at least one shoulder of the user, said reservoir being in fluid communication with said fluid so that the level of said fluid is maintained within a predetermined range;
d) means for supplying pressurized breathing gases; and
e) regulator means operatively connected to said fluid and said means for supplying pressurized breathing gases, for supplying breathing gases to the user, at a pressure about equal to the pressure of said fluid at the level of the user's lungs;
said suit providing a balanced counterpressure to acceleration forces by exerting pressure on substantially all body surface area underneath the suit, thereby reducing distension in the user's blood vessels and pooling of blood in the user's dependent body parts.

20. The system as recited in claim 18, wherein said inner and outer liners are attached at one or more locations on the body of the user, thereby eliminating the fluid compartment at said locations in order to further reduce the weight of the suit.

* * * * *